Guseman, Davis & McGeorge.
Seed Dropper
No. 104,302. Patented June 14, 1870.

Witnesses.
Villette Anderson
Chas. Kenyon

Inventors
H. D. Guseman
J. A. Davis
H. D. McGeorge
Chipman Hosmer & Co
Attys

United States Patent Office.

WILLIAM D. GUSEMAN, JAMES A. DAVIS, AND H. D. McGEORGE, OF MORGANTOWN, WEST VIRGINIA.

Letters Patent No. 104,302, dated June 14, 1870.

IMPROVEMENT IN SEED-SOWERS.

The Schedule referred to in these Letters Patent and making part of the same.

To all whom it may concern:

Be it known that we, WILLIAM D. GUSEMAN, JAMES A. DAVIS, and H. D. McGEORGE, of Morgantown, in the county of Monongalia and State of West Virginia, have invented a new and valuable Improvement in Seed-Sowers; and we do hereby declare that the following is a full, clear, and exact description of the construction and operation of the same, reference being had to the annexed drawing making a part of this specification, and to the letters and figures of reference marked thereon.

Figure 1 of the drawing is a top view of our invention.

Figure 1:
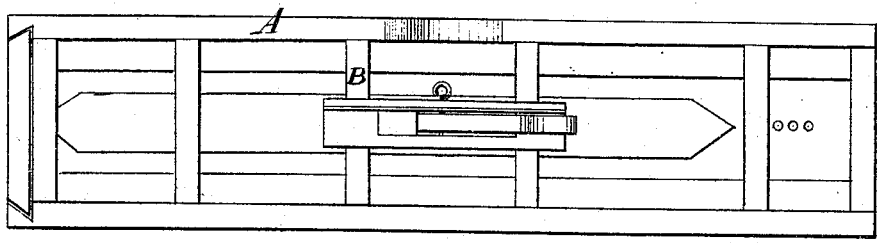
Figure 2:
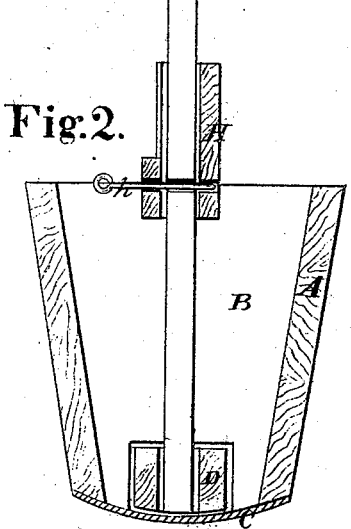
Figure 2 is a transverse vertical section.
Figure 4:
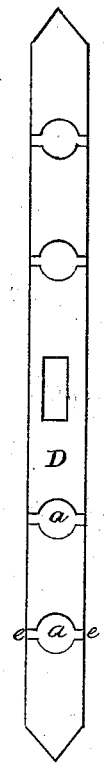
Figure 4 is a bottom view of the sliding bar.
Figure 3:
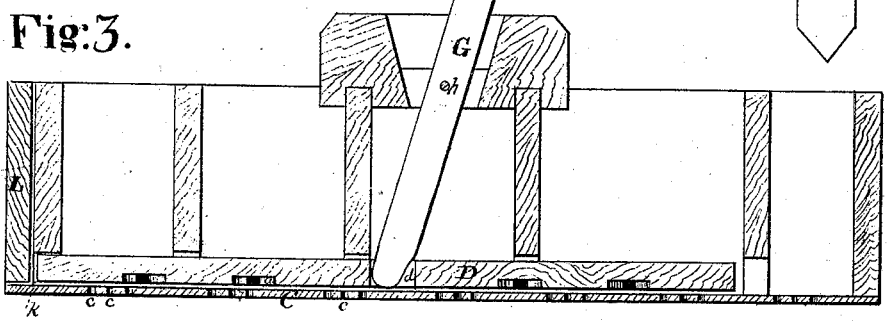
Figure 3 is a central longitudinal vertical section.

Our invention relates to seed-sowing machines, and consists in certain improvements in the seed-box and in the perforated sliding bar therein, designed to render the box capable of sowing every grain within it, and to provide means for taking out of the box any residue which may remain after the day's work is done.

The letter A of the drawing designates the wall of the seed-box or trough.

B, the subdividing partitions, arranged transversely within it.

C represents the bottom of the trough, provided with a row of perforations, c c, along the center line thereof.

The bottom is curved or bent downward transversely, from each side toward the center line, thus causing the seed to slide to the center. Therefore it will be all gathered by the notches of the sliding bar, and carried through the perforations c c.

D designates the sliding bar, having its lower surface curved transversely to correspond with the curvature of the bottom of the seed-box. It is made pointed at each end, in order that it may pass more easily through the seed, and is provided with the circular pockets a a in the under side.

Small entrances, e e, are made on each side of the bar leading to these circular recesses for the passage of the seed.

These circular recesses are designed to draw the seed toward the center line, and, consequently, over and into the perforations c c.

The bar D slides through openings made in the bottom of the partitions B, and is thereby kept close to the bottom of the trough.

A slot, d, is made at or near the center of the bar, into which is inserted the toe of the operating lever G, which is pivoted to a block, H, attached to the two central partitions B.

The pivot-pin h is made removable, in order that the lever may be taken out at any time.

In order to provide for the removal of any seed which may remain over, or for taking out of the box anything which may be too large to pass through the perforations, an opening, k, is made in one end of the trough, through which the sliding bar may be readily removed.

During the operation of sowing, this opening is closed by a slide, L, covering the end of the trough, and kept in place by grooves or dovetail channels, formed in the ends of the longitudinal walls of the trough.

I do not claim, broadly, a seeding-box with apertures in its bottom, or a sliding bar operating therein; but

What we claim as our invention, and desire to secure by Letters Patent, is—

The seeding-box herein described, constructed with a curved bottom, C, with apertures therein, as shown, together with the sliding bar D, curved at its bottom, the circular recesses a, and removable slide L, when arranged to operate substantially as and for the purpose specified.

In testimony that we claim the above, we have hereunto subscribed our names in the presence of two witnesses.

W. D. GUSEMAN.
JAS. A. DAVIS.
H. D. McGEORGE.

Witnesses:
T. MEEKS,
A. G. STURGISS.